(12) United States Patent
Hayashi et al.

(10) Patent No.: US 6,528,548 B2
(45) Date of Patent: Mar. 4, 2003

(54) SYNTHETIC THERMOPLASTIC RESIN EXTRUDED FOAMS AND METHODS FOR PRODUCING THE SAME

(75) Inventors: Takahiro Hayashi, Osaka (JP); Kenkichi Tanaka, Osaka (JP); Toshiya Ito, Hokkaido (JP); Takahiro Tayauchi, Tokyo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/926,153

(22) PCT Filed: Jan. 14, 2001

(86) PCT No.: PCT/JP01/00010

§ 371 (c)(1), (2), (4) Date: Sep. 13, 2001

(87) PCT Pub. No.: WO01/51551

PCT Pub. Date: Jul. 19, 2001

(65) Prior Publication Data

US 2002/0198272 A1 Dec. 26, 2002

(30) Foreign Application Priority Data

Jan. 14, 2000 (JP) ............................ 2000-007085
Jan. 19, 2000 (DE) ............................ 100 01 907

(51) Int. Cl.$^7$ .................................................. C08J 9/12
(52) U.S. Cl. .............................. 521/79; 521/81; 521/83; 521/86; 521/98
(58) Field of Search ............................. 521/79, 81, 83, 521/86, 98

(56) References Cited

U.S. PATENT DOCUMENTS

| | | | |
|---|---|---|---|
| RE30,193 E | * | 1/1980 | O'Shaughnessy |
| 4,425,440 A | * | 1/1984 | Bloembergen et al. |
| 4,616,042 A | * | 10/1986 | Avakian |
| 5,064,874 A | | 11/1991 | Motani et al. ............... 521/146 |
| 5,453,454 A | | 9/1995 | Alicke et al. ................. 521/79 |
| 5,601,753 A | | 2/1997 | Omure et al. ................ 252/350 |
| 6,315,932 B1 | | 11/2001 | Fujiwara et al. .............. 264/53 |
| 6,331,576 B1 | * | 12/2001 | Kusakawa |

FOREIGN PATENT DOCUMENTS

| | | |
|---|---|---|
| EP | 09783363 A1 | 2/2000 |
| EP | 1024163 A1 | 8/2000 |
| JP | 04-253740 | 9/1992 |
| JP | 07-507087 | 3/1995 |
| JP | 08-012796 | 1/1996 |
| JP | 10-265605 | 10/1998 |
| JP | 10-273548 | 10/1998 |
| JP | 11-080402 | 3/1999 |
| WO | WO 01/30896 | 5/2001 |

* cited by examiner

*Primary Examiner*—Morton Foelak
(74) *Attorney, Agent, or Firm*—Armstrong, Westerman & Hattori, LLP

(57) ABSTRACT

An object is to provide a synthetic thermoplastic resin extruded foams having excellent thermal insulating properties and a method for producing the same, in which environment friendly water is used as a blowing agent in the most effective way while reducing the amount of blowing agents that affect the environment, and it is feasible to improve the production ratio of small cells in foams made up of large cells and small cells.

A synthetic thermoplastic resin extruded foams having a foam density of 15 to 50 kg/m$^3$ and an excellent cell structure which has an average call size of 0.7 mm or smaller or which mainly comprises small cells having a cell size of 0.25 mm or smaller and large cells having a cell size of 0.3 to 1 mm; and a method for producing the foams are provided, wherein the foams contains 0.2 to 10 parts by weight of bentonite, and water is used as a blowing agent.

8 Claims, No Drawings

SYNTHETIC THERMOPLASTIC RESIN EXTRUDED FOAMS AND METHODS FOR PRODUCING THE SAME

TECHNICAL FIELD

This invention relates to synthetic thermoplastic resin extruded foams and a method for producing the same. More particularly, it relates to a synthetic thermoplastic resin extrusion-foamed board which has high-efficiency thermal insulating properties and suitable strength properties and is especially useful as a thermal insulation material and to a method for producing the same.

BACKGROUND ART

Having excellent thermal insulating properties, synthetic resin extruded foams are used as thermal insulating constructional materials for houses, etc. to contribute to energy saving and are expected as one of promising countermeasures against global warming.

Processes using a volatile blowing agent predominate in production of synthetic resin extruded foams. A volatile blowing agent used in the processes serves not only for foaming energy but as a plasticizer in an extrusion system. Further, a volatile blowing agent performs the function of controlling the cell size and the cell growth rate in a forming stage and, being present in the cells of a foamed body, greatly influences the performance of the foamed body, particularly the thermal conductivity which governs thermal insulating properties. Hence, selection of a volatile blowing agent has always been a primary subject of study in developing extrusion foaming techniques.

A combination of a slightly permeable blowing agent which controls the performance of foams and a easily permeable blowing agent which influences the foaming energy and the cell growth rate has often been used in synthetic resin extrusion foaming. Slightly permeable blowing agents typically include chlorofluorohydrocarbons (HCFC), such as 1,1-difluoro-1-chloroethane (hereinafter abbreviated as HCFC142b), fluorohydrocarbons (HFC), such as 1,1,1,2-tetrafluoroethane (hereinafter abbreviated as HFC134a), and hydrocarbons, such as propane and butane. Easily permeable blowing agents typically include halogenated hydrocarbons such as methyl chloride and ethyl chloride.

In recent years, environmental problems including destruction of the ozonosphere, global warring, and air and water pollution by chemical substances have been confronting us, and it has been desired to use as environmentally friendly a blowing agent as possible, It will be fulfillment of the social demand to develop synthetic resin extruded foams having high thermal insulating properties by use of a clean blowing agent such as water or inorganic gas with no, or a reduced amount of, flons, halogenated hydrocarbons and, if possible, saturated hydrocarbons.

It has been studied for a long time to utilize water, which seems typical of the cleanest blowing agents, as a blowing agent. For example, injection of water into an extruder has already been attempted as suggested in JP-A-58-176226, but every effort has failed to materialize, i,e., to be industrialized because of difficulty in dispersing water in a synthetic resin.

JP-A-3-109445, JP-A-3-27304 and JP-A-4-80240 disclose a method in which water is uniformly dispersed in a synthetic resin to improve the cell structure of foams thereby to improve thermal insulating properties. In this process SCFC142b, one of flons, is used as an example of slightly permeable blowing agents, and methyl chloride is used as an example of easily permeable blowing agents. The foam is made up mainly of cells having a diameter of 0.25 mm or smaller and cells having a diameter of 0.4 to 1 mm. In order to obtain such a cell structure, water is used in combination with a granular matter, which has hydroxyl groups on its surface layer or a water-absorbent high molecular compound.

However, because water is incompatible with synthetic resins, the amount of water that can be added is limited even when the above process is adopted, Too much water added is hardly dispersed in a synthetic resin uniformly, which can result in such phenomena as generation of pores in the foam. It has therefore been desired that water not only be used for more improvement on the cell structure but be made more effective use of as a part of a blowing agent.

On the other hand, WO99/54390 discloses powdered silicates exemplified by magnesium silicate as a water-absorbing medium. The disclosure teaches a combined use of water in the production of a cell structure having two kinds of cells (large calls and small calls) in the presence of limited kinds of gases in a limited gas ratio. As noted, the teaching is confined to application tinder specific conditions in terms of kind and ratio of gases, not covering a broad range of conditions. Further, addition of a large quantity of magnesium silicate recited in the publication tends to make it difficult to maintain a closed-cell structure and to make cells extremely smaller, resulting in insufficient teaming. For these reasons, the amount of magnesium silicate to be added has to be limited. The amount of water that can be added is also limited on account of its dispersibility in the extrusion system. Improvements have been demanded in these respects.

JP-W-8-502786 discloses a method for producing a styrene resin extruded foams by using water as part of a blowing agent, wherein the styrene resin material is made water-soluble by kneading with a low-molecular polymer, an oligomer, a hydrophobic polymer, etc. Substantially, however, the amount of water used as part of a blowing agent is limited. The teaching fails to achieve a reduction of a conventionally employed volatile blowing agent and to provide synthetic resin extruded foams with excellent thermal insulating performance.

A proposal has been awaited for producing foams with excellent thermal insulating properties by using environment friendly and inexpensive water while reducing use of a blowing agent that affects the environment.

The present invention has been accomplished in the light of the above-mentioned background art. It is an object of the present invention to provide foams having excellent thermal insulting properties by using environment friendly water while using no, or a reduced amount of, blowing agents which affect the environment causing destruction of the ozonosphere, global warming and the like, such as HCFC142b and methyl chloride.

DISCLOSURE OF THE INVENTION

The present inventors have conducted extensive investigations as to how to disperse incompatible water in a synthetic thermoplastic resin uniformly to be used as a blowing agent. They have noted water-containing silicate minerals having a characteristic crystal structure and effective in water retention. Of the silicate minerals, bentonite was found to have adequate nucleating properties to secure closed cells and not to cause insufficient foaming due to make calls extremely smaller even when added in a large quantity and also found to allow water to be added in an increased amount. That is, it was found that bentonite, when added to a synthetic thermoplastic resin, increases the amount of water that can be uniformly dispersed and held in a molten synthetic thermoplastic resin and improves the expansion ratio. Since water can be used in an increased amount, a high expansion ratio is maintained even if the amount of other blowing agents is decreased. Secondly, in producing foams whose cell structure mainly comprises cells having a cell size of 0.25 mm or smaller (hereinafter sometimes called smaller cells) and cells having a cell size of 0.3 to 1 mm (hereinafter sometimes referred to as larger cells) which are dispersed via cell walls in a sea-island structure, bentonite was found to make it easier to form the smaller cells having a cell size of 0.25 mm or smaller, which are often difficult to produce in an adequate proportion. That is, bentonite makes it possible to increase the area ratio of the smaller cells in a cross-sectional area of foams. As a result, the thermal insulating properties of the foams are further improved, and the range of the conditions for producing foams having both the smaller cells and the larger cells in a stable manner can be broadened. The present invention has been reached based on these findings.

The present invention provides:

(1) A synthetic thermoplastic resin extruded foams characterized by containing 0.2 to 10 parts by weight of bentonite per 100 parts by weight of a synthetic thermoplastic resin.

(2) The synthetic thermoplastic resin extruded foams according to (1) above, wherein water as a blowing agent is used in an amount of 0.2 to 4 parts by weight.

(3) The synthetic thermoplastic resin extruded foams according to (1) or (2) above, which have a density of 15 to 50 kg/m³.

(4) The synthetic thermoplastic resin extruded foams according to any one of (1) to (3) above, wherein the cells which constitute the synthetic thermoplastic resin extruded foams have an average cell size of 0.7 mm or smaller.

(5) The synthetic thermoplastic resin extruded foams according to any one of (1) to (3) above, characterized in that the cells which form the synthetic thermoplastic resin extruded foams mainly comprise cells having a cell size of 0.25 mm or smaller and cells having a cell size of 0.3 to 1 mm, these cells being dispersed via cell walls in a sea-island structure, and the cells having a cell size of 0.25 mm or smaller have an area ratio of 10 to 90% in a Cross-sectional area of the loams.

(6) The synthetic thermoplastic resin extruded foams according to any one of (1) to (5) above, wherein the synthetic thermoplastic resin is a polystyrene resin.

(7) The synthetic thermoplastic resin extruded foams according to any one of (1) to (6) above, wherein the foams are a boards having a thickness of 10 to 150 mm (8) The synthetic thermoplastic resin extruded foams according to any one of (1) to (7) above, which is characterized by using 0.05 to 3 parts by weight of liquid paraffin as a viscosity modifier.

(9) A methods for producing the syntactic thermoplastic resin extruded foams according to any one of (1) to (8) above comprising injecting a blowing agent into a molten synthetic thermoplastic resin and extrusion foaming the resin, which is characterized in that the foams contains 0.2 to 10 parts by weight of bentonite per 100 parts by weight of a synthetic thermoplastic resin and that water is used as a blowing agent.

Bentonite, as referred to in the present invention, is a basic clay mineral comprising montmorillonite as a main component with accompanying minerals such as quartz, α-crystobalite, opal, feldspar, mica, etc. From the aspect of chemical composition, bentonite comprises silicon oxide as a primary component and aluminum oxide as a secondary component. Montmorillonite is clay mineral made up of about 1 nm thick silicate layers forming a plate-like crystal grain, the planar surface of which is negatively charged with exchangeable cations of sodium, calcium, etc. intercalated to keep electrical neutrality as a whole. On contact with water, the exchangeable cations among layers are hydrated with water molecules to expand between layers. The term "magnesium silicate," as referred to in the publication cited above denotes a substance comprising silicon oxide as a primary component and magnesium oxide as a secondary component.

Typical examples of bentonite species which can be used in the invention are natural bentonite and purified bentonite. Also included are organic bentonite and modified montmorillonite, such as anionic polymer-modified montmorillonite silane-treated montmorillonite, and highly polar organic solvent-montmorillonite complex.

Bentonite is available for example, from HOJUN KOGYO CO., LTD. under the trade names of Bentonite Hodaka, BENGEL, etc. The bentonite species can be used either individually or as a mixture of two or more thereof.

Bentonite is used to absorb water that is incompatible with a synthetic thermoplastic resin to form gel, which is considered capable of being dispersed in the synthetic thermoplastic resin. The amount of bentonite to be added is preferably 0.2 to 10 parts by weight, particularly 1 to 5 parts by weight, per 100 parts by weight of the synthetic resin. Where the amount of bentonite is less than 0.2 part by weight, the water absorption capacity of bentonite is insufficient for the amount of water injected, tending to cause blow hole development due to non-diffusion of water in an extruder. Where the amount of bentonite exceeds 10 parts by weight, the excess inorganic powder in the synthetic resin is difficult to uniformly disperse therein, which can cause cell unevenness and may lead to difficulty in maintaining closed cells. It tends to follow that the resulting foam has deteriorated thermal insulating properties and shows scatter in thermal insulating properties. An ideal mixing ratio of water to bentonite is 0.02 to 20, particularly 0.25 to 2, by weight.

The synthetic thermoplastic resin extruded foams according to the invention are obtained by adding 0.2 to 10 parts by weight of bentonite to 100 parts by weight of a synthetic thermoplastic resin, heat-melting and kneading the mixture, injecting 0.2 to 4 parts by weight (preferably 0.3 to 3.5 parts by weight) of water or a combination of 0.2 to 4 parts by weight of water and a blowing agent other than water into the molten resin and extruding the mixture into a lower pressure zone for foaming.

Where the ratio of water to the blowing agent other than water is small, where water and the blowing agent other than water do not make an azeotropic mixture, and where the amount of a nucleating agent is small, there is obtained foams having a characteristic cell structure in which smaller calls of 0.25 mm or smaller and larger cells of 0.3 to 1 mm are dispersed via cell walls to make a sea-island structure.

Foams having such a larger/smaller cell structure are excellent in thermal insulating properties and mechanical strength. The excellency of foams having the larger/smaller cell structure in thermal insulating properties is assumed attributable to the fine cells of not greater than 0.25 mm which exist around larger cells of 0.3 to 1 mm cutting the heat flow, which could flow through the uniform cell structure of conventional foams having a uniform cell structure. With respect to flexural strength and deflection in bending, it seems that suitable flexural characteristics are exhibited because the stress on the cell walls is dispersed by, for example, the fine cells of 0.25 mm or smaller existing in a sea-island structure.

Where it is aimed at to obtain foams having a larger/smaller cell structure, the area ratio of the smaller cells having a cell size of 0.25 mm or smaller is adjusted in a range of from 10 to 90% in a cross-sectional area of the forms. The area ratio of the smaller cells in a cross-sectional area of the foams is preferably 20 to 90%, still preferably 30 to 90%, particularly preferably 40 to 90%. A higher area ratio of the smaller cells is preferred for improvement in thermal insulating properties as stated above.

In the present invention, either foams having a conventional uniform cell structure or foams having a larger/smaller cell structure can be manufactured for choice according to the performance required.

The water-absorbing medium used in the invention may he a mixture of bentonite and, as a substance providing an auxiliary effect, a water-absorbent high molecular compound or a granular matter which has hydroxyl groups on its surface layer. The water-absorbent high molecular compound includes polyacrylic acid salt resins available from, for example, Nippon Shokubai Co., Ltd. under a trade name of AQTALIC CA. The water-absorbent high molecular compound functions similarly to bentonite. The amount of the water-absorbent high molecular compound to be added preferably ranges from 0.2 to 10 parts by weight, particularly 0.2 to 2 parts by weight, per 100 parts by weight of the synthetic resin. Where the amount of is less than the above range, the water absorption capacity of the water-absorbent high molecular compound is insufficient for the amount of water injected to cause blow hole generation due to non-diffusion of water in an extruder resulting in a foaming defect. Where the amount exceeds the above range, non-diffusion of the water-absorbent high molecular compound in the synthetic resin can result to cause cell unevenness, and the foams suffer from deterioration and scatter in thermal insulating properties. Because the water-absorbent high molecular compound absorbs water into gel the viscosity of which is much higher than that of bentonite, and the gel tends to fail to be dispersed in an extruder, it is preferred for the water-absorbent high molecular compound to be used in combination with bentonite.

The granular matter which ham hydroxyl groups on its surface layer typically includes anhydrous silica having silanol groups on the surface thereof, such as AEROSIL (average particle size: $12 \times 10^{-3}$ $\mu$m) available from Nippon Aerosil Co., Ltd. The amount of the granular matter which has hydroxyl groups on its surface layer is preferably used in an amount of 0.05 to 2 parts by weight, particularly 0.1 to 0.5 part by weight, per 100 parts by weight of the synthetic resin. Where the amount is less than the above range, there is a tendency that the number of smaller cells formed decreases. Where the amount exceeds the above range, smaller cells tend to be difficult to form.

Water which can be used in the invention is not particularly limited. For example, pure water can be used.

Blowing agents which can be used in the invention in addition to water are volatile blowing agents generally employed in extrusion foaming. Specific examples of useful blowing agents include ethers, e.g., dimethyl ether, diethyl ether, and methyl ethyl ether; alcohols, e.g., methanol, ethanol, propyl alcohol, isopropyl alcohol, butyl alcohol, isobutyl alcohol, and t-butyl alcohol; inorganic gases, e.g., carbon dioxide, nitrogen, argon and helium; saturated hydrocarbons having 3 to 6 carbon atoms, e.g., propane, isobutane n-butane and pentane; halogenated hydrocarbons, e.g., methyl chloride and ethyl chloride; flons, e.g., 1-difluoro-1-chloroethane (HCFC142b), 1,1,1,2-tetrafluoroethane (HFC134a), 1,1-diflfuoroethane (HFC152a), 1,1,1-trifluoroethane (HFC143a), 1,1,1,2,3,3-hexafluoropropana (HFC236ea), and 1,1,1,3,3-pentafluoropropane (HEC245fa); and ketones, e.g., acetone, dimethyl ketone and methyl ethyl ketone. These blowing agents can be used either individually or as a mixture of two or more thereof.

Where the amount of water or the total amount of water and the other blowing agents is small, the resulting synthetic resin foams tend to have a reduced expansion ratio, and the foams tends to show increased shrinkage after extrusion. Accordingly, the amount is preferably adjusted to be 0.05 mol or more, particularly 0.15 mol or more, per 100 g of the synthetic resin (the unit "mol" as used herein is the total mole number of water and the other blowing agents). Where the amount is too much, the foams tend to have reduced dimensional stability. Accordingly, the amount is preferably 0.6 mol or less, particularly 0.3 mol or less, per 100 g of the synthetic resin.

The present invention in not restricted by the manner of injecting or adding water or a combination of water and other blowing agents. They may be added simultaneously after heat melting by injection or a like means, or they may be injected or added separately.

The pressure for injecting water or a combination of water and the other blowing agents into the heat-melted and kneaded mixture is not particularly limited as far as they may be incorporated under a higher pressure than the inner pressure of the extruder.

The synthetic thermoplastic resin and additives are compounded in a prescribed ratio, and the compound is heat-melted and kneaded. Water or a combination of water and the other blowing agents is injected or added thereto, and the mixture is extrusion foamed to obtain foams of the invention, The heating temperature, the melt-kneading time, and the melt-kneading means in the heat-melting and kneading of the synthetic thermoplastic resin and additives are not particularly limited. The heating temperature is at or above the temperature at which the synthetic thermoplastic resin is melted, usually 130 to 250° C. Varying depending on the output per unit time, the melt-kneading means, and the like, the melt-kneading time cannot be specified. Usually, the time required for the synthetic thermoplastic resin and additives to be dispersed uniformly in chosen. The melt-kneading means includes a screw extruder but is not limited thereto, and any means commonly employed in extrusion foaming can be used, As the ratio of general organic volatile blowing agents, such as methyl chloride and HCFC142b, used as blowing agents other than water decreases, the effect of these blowing agents in plasticizing the synthetic thermoplastic resin in an extruder is lessened. It tends to follow that the melt viscosity of the synthetic thermoplastic resin increases to make it difficult for water and bentonite to be dispersed uniformly. The increased load on the extruder can cause a disorder of the equipment and a disturbed flow distribution of the synthetic thermoplastic resin in the foaming equipment. In order to compensate therefor, it is preferred to add a viscosity modifier, such as a plasticizer, e.g., liquid paraffin.

Liquid paraffin is available, e.g., from Mobil Sekiyu K.K. under the trade name "WHITEREX". The amount of the viscosity modifier to be added is preferably adjusted between 0.05 to 3 parts by weight per 100 parts by weight of the synthetic resin. Where the amount exceeds this range, the foams undergo considerable dimensional changes with temperature and has a lowered heat resistance temperature.

The synthetic thermoplastic resin which can be used in the invention includes polystyrene resins, polyethylene resins, polypropylene resins, and polyurethane resins. Preferred of them are polystyrene resins, polyethylene resins, and polypropylene resins for their suitability to extrusion foaming. Particularly suitable are polystyrene resins which have the advantage of excellent thermal insulating properties and good stiffness but still need improvement on deflection. Polystyrene resins include polystyrene, copolymers of styrene and α-methylstyrene, maleic anhydride, acrylic acid, acrylic esters, methacrylic acid, methacrylic esters, etc., and polystyrene modified by appropriate addition of styrene-butadiene rubber (SBR), etc.

If desired, a nucleating agent can be compounded into the synthetic thermoplastic resin. The nucleating agent typically includes talc powder and calcium carbonate powder. These nucleating agents can be used either individually or as a mixture of two or more thereof. The nucleating agent preferably has a particle diameter of 3 to 100 $\mu$m, particularly 5 to 20 $\mu$m. The nucleating agent is used chiefly for forming cells having a cell size of 0.3 to 1 mm. The nucleating agent is preferably used in amount of 0.05 to 5 parts by weight, particularly 0.1 to 2.5 parts by weight, per 100 parts by weight of the synthetic thexoplastic resin.

Where the amount is less than the above range, the effects expected from the addition of the nucleating agent are not fully produced, and the cell size tends to become too large, Where the amount is more than the above range, fine cells are formed, but a desired density is difficult to achieve.

In the present invention, other additives customarily used can be added in appropriate amounts in addition to the above-described bentonite, water-absorbent high molecular compound, nucleating agent, and granular matter, which has hydroxyl groups on its surface layer. Such additives include flame retardants e.g., hexabromocyclododecane; antioxidants, e.g., polymeric hindered phenol compounds; lubricants, e.g., barium stearate and magnesium stearate; and colorants.

Foaming can be carried out by a general method in which the foaming compound is released into a lower pressure zone through a slit die, and the foam is shaped into a plate having a large cross-sectional area by means of a mold, a roll, etc. which is in close contact with or adjacent to the slit die. Where the foams have a uniform cell structure, the cell size is not particularly limited but is preferably 0.7 mm or smaller, particularly 0.3 mm or smaller, so as to secure favorable thermal insulating properties, mechanical strength and processability.

The foams of the invention are not limited in thickness. To enjoy favorable thermal insulating properties, flexural strength and deflection in bending, foams with some thickness like general plates are preferred to thin sheeting. The thickness is usually 10 to 150 mm, preferably 20 to 100 mm. To enjoy lightness with excellent thermal insulating properties and flexural strength, it is preferred for the foams to have a density of 15 to 50 kg/m$^3$, particularly 25 to 40 kg/$^3$.

BEST MODE FOR CARRYING OUT THE INVENTION

The synthetic thermoplastic resin extruded foams and the method for producing it according to the present invention will be described in more detail with reference to Examples, but it should be understood that the invention is not construed as being limited thereto. The methods described below were followed to examine the physical properties of the resulting foams, i.e., density, appearance, thermal conductivity, and smaller cell area ratio.

(1) Foam Density

Obtained from the following formula:

$$\text{Foam density}=\text{foam weight/foam volume}$$

(2) Foam Appearance

The foams were observed with the naked eye. Foams with a smooth skin and without giant cells, such as voids, nor cell unevenness were judged good (marked with ○) and those with a non-smooth ski, giant cells such as voids, and cell unevenness were judged bad (marked with x).

(3) Thermal Conductivity

Measured in accordance with JIS A9511.

(4) Smaller Cell Area Ratio

The area ratio of cells having a cell size of 0.25 mm or smaller in the cross-sectional area of the foams was obtained as follows. The language "cells having a cell size of 0.25 mm or smaller" refers to cells whose circle equivalent diameter is 0.25 mm or smaller.

a) A cross-section of the foams are photographed under a scanning electron micrograph (Model S-450, supplied from Hitachi, Ltd.) at 30 times magnification.

b) An OHP sheet is put on the photomicrograph, and the cells having a length greater than 7.5 mm in the thickness direction (equivalent to the cells whose real size in the thickness direction is greater than 0.25 mm) were traced on the OHP sheet by blacking out in ink (primary processing).

c) The primarily processed image is inputted into an image processor (Model PIAS-II, available from Pias K.K.) and distinguished between deep colored parts (shadows) and light colored parts (highlights) i.e., between blacked parts and non-blacked parts.

d) Of the shadows the parts whose area is equal to or less than that of a circle having a diameter of 7.5 mm, i.e., the parts whose diameter in the thickness direction is long but whose area is equal to or less than that of a circle having a diameter of 7.5 mm are changed into highlights to correct the shadows.

e) "FRACTAREA (area ratio)" is used to obtain the area ratio of cells having a cell diameter of 7.5 mm or smaller in the total image (the highlights in the image composed of highlights and shadows) from the following formula.

$$\text{Smaller cell area ratio }(\%)=(1-\text{area of shadows/total image area})\times 100$$

EXAMPLE 1

A hundred parts by weight of a polystyrene resin (Kanelight PS, available from Kaneka Corp.; malt index (MI): 3) was mixed with 2 parts by weight of bentonite (Bengel 15, available from Hojun Kogyo Co., Ltd.), 0.1 part by weight of anhydrous silica (AEROSIL, available from Nippon Aerosil Co., Ltd.) as granualar tatter which has hydroxyl groups on its surface layer, 0.3 part by weight of tale as a nucleating agent, 3 parts by weight of hexabromocyclododecane as a flame retardant, and 0.3 part by weight of barium stearate as a lubricant. The mixture was heat-kneaded in an extruder at 200° C. Watex (0.5 part by weight) and, as other blowing agents, 4 parts by weight of methyl chloride and 3 parts by weight of propane, which are volatile blowing agents, were injected into the mixture while kneaded. After kneading, the mixture was cooled to about 120° C. and extrusion foamed through a slit having a gap of 2 mm into a mold having the inner wall coated with a fluororesin to obtain a styrene resin foamed plate having a thickness of 90 to 100 mm. The results are shown in Table 1. Even though the amount of methyl chloride was reduced, as is favorable for the working environment, compared with Comparative Example 1 hereinafter described, the resulting foams maintained a high expansion ratio, having a foam density of 30 kg/m$^3$, and a satisfactory appearance.

EXAMPLE 2

Foams were obtained in the same manner as in Example 1, except for changing the amount of water injected to 1.5 parts by weight and changing the amounts of the volatile blowing agents, i.e., methyl chloride and propane, to 1.5 parts by weight and 3 parts by weight, respectively. The results obtained are shown in Table 1. Even though the amount of methyl chloride was further reduced, a high expansion ratio was maintained, and foam.s having a foam density of 30 kg/m$^3$ with a satisfactory appearance was obtained.

COMPARATIVE EXAMPLE 1

Foams were obtained in the same manner as in Example 1, except that bentonite was not added, water was not injected, and 5.5 parts by weight of methyl chloride and 3 parts by weight of propane, which are volatile blowing agents, were injected instead. The results are shown in Table 1. Foams having a foam density of 30 kg/m$^3$ with a satisfactory appearance was obtained, but the amount of methyl chloride was large.

COMPARATIVE EXAMPLE 2

Foams were obtained in the same manner as in Example 1, except that 0.1 part by weight of bentonite was added, and 0.5 part by weight of water, 4 parts by weight of methyl chloride, and 3 parts by weight of propane, the latter two being volatile blowing agents, were injected. The results are shown in Table 1. The resulting foams had a poor appearance which is considered attributed to insufficient dispersion of water.

COMPARATIVE EXAMPLE 3

Foams were obtained in the same manner as in Example 1, except that 12 parts by weight, which was an excessive amount, of bentonite was added and that 4.5 parts by weight of water, 1.5 parts by weight of methyl chloride, and 3 parts by weight of propane, the latter two being volatile blowing agents, were injected. The results are shown in Table 1. Bentonite, being used in excess, was not dispersed in the synthetic resin satisfactorily, resulting in cell unevenness. Dispersion of water was also unsatisfactory only to provide foams with a poor appearance.

EXAMPLE 3

Foams were obtained in the same manner as in Example 1, except that 1.5 parts by weight of bentonite was added, 0.5 part by weight of water was injected, and 2.7 parts by weight of methyl chloride and 11 parts by weight of HCFC142b, which are volatile blowing agents, were injected. The results are shown in Table 1. Even though the amount of methyl chloride was reduced as compared with Comparative Example 4 hereinafter described, the resulting foams maintained a high expansion ratio, having a foam density of 29 kg/m$^3$, and presented a satisfactory appearance.

EXAMPLE 4

Foams were obtained in the same manner as in Example 1, except that 1.5 parts by weight of bentonite was added, 1.5 parts by weight of water was injected, and 11 parts by weight of HCFC142b, which is a volatile blowing agents, was injected. The results are shown in Table 1. Even with no methyl chloride, a high expansion ratio was maintained to provide foams having a foam density of 29 kg/m$^3$ with a satisfactory appearance.

EXAMPLE 5

Foams were obtained in the same manner as in Example 1, except that 1.5 parts by weight of bentonite was added, 2 parts by weight of water was injected, and 8 parts by weight of HCFC142b, which is a volatile blowing agent, was injected. The results are shown in Table 1. Even with no methyl chloride and with a decreased amount of HCFC142b, which has a relatively high coefficient of ozonosphere destruction, compared with Comparative Example 4 hereinafter given, a high expansion ratio was maintained to provide foams having a foam density of 29 kg/$^3$ with a satisfactory appearance.

EXAMPLE 6

Foams were obtained in the same manner as in Example 1, except that 0.5 part by weight of bentonite was added, 2 parts by weight of water was injected, and 8 parts by weight of BCFC142b, which is a volatile blowing agent, was injected. The results are shown in Table 1. Without using methyl chloride and with a decreased amount of HCFC142b, which has a relatively high coefficient of ozonosphere destruction, compared with Comparative Example 4 hereinafter given, a high expansion ratio was maintained to provide foams having a foam density of 29 kg/m$^3$ with a satisfactory appearance.

EXAMPLE 7

Foams were obtained in the same manner as in Example 1, except that 8 parts by weight of bentonite was added, 3.5 parts by weight of water was injected, and 8 parts by weight of HCFC142b, which is a volatile blowing agent, was injected. The results are shown in Table 1. Even with no methyl chloride and with a decreased amount of HCFC142b, which has a relatively high coefficient of ozonosphere destruction, compared with Comparative example 4 hereinafter given, a high expansion ratio was maintained to provide foams having a foam density of 31 kg/m$^3$ with a satisfactory appearance.

COMPARATIVE EXAMPLE 4

Foams were obtained in the same manner as in Example 1, except that bentonite was not added, water was injected, and 4 parts by weight of methyl chloride and 11 parts by weight of HCFC142b, which are volatile blowing agents, were injected instead. The results are shown in Table 1. Foams having a foam density of 29 kg/m$^3$ with a satisfactory appearance was obtained, but the amounts of methyl chloride and HCFC142b were large.

The resulting foams presented a satisfactory appearance and

TABLE 1

| Formulation and Evaluation | Example | | | | | | | Compara. Example | | | |
|---|---|---|---|---|---|---|---|---|---|---|---|
| | 1 | 2 | 3 | 4 | 5 | 6 | 7 | 1 | 2 | 3 | 4 |
| Water (pt. by wt.) | 0.5 | 1.5 | 0.5 | 1.5 | 2 | 2 | 3.5 | | 0.5 | 4.5 | |
| HCFC142b (pt. by wt.) | | | 11 | 11 | 8 | 8 | 8 | | | | 11 |
| Methyl chloride (pt. by wt.) | 4 | 1.5 | 2.7 | | | | | 5.5 | 4 | 1.5 | 4 |
| Propane (pt. by wt.) | 3 | 3 | | | | | | 3 | 3 | 3 | |
| Total mole number of blowing agents (mol/100 g-resin) | 0.175 | 0.181 | 0.191 | 0.193 | 0.191 | 0.191 | 0.274 | 0.177 | 0.175 | 0.348 | 0.189 |
| Molar percent of water (%) | 16 | 46 | 15 | 43 | 58 | 58 | 71 | | 16 | 72 | |
| Molar percent of blowing agent(s) other than water (%) | 84 | 54 | 85 | 57 | 42 | 42 | 29 | 100 | 84 | 28 | 100 |
| Bentonite (pt. by wt.) | 2 | 2 | 1.5 | 1.5 | 1.5 | 0.5 | 8 | | 0.1 | 12 | |
| Foam density (kg/m$^3$) | 30 | 30 | 29 | 29 | 29 | 29 | 31 | 30 | 32 | 42 | 29 |
| Foam appearance | ○ | ○ | ○ | ○ | ○ | ○ | ○ | ○ | x | x | ○ |

Examples 8 to 13 described below are pertinent to foams made of larger cells and smaller cells. Comparative Examples 5 to 9 are given for comparison.

EXAMPLE 8

A hundred parts by weight of a polystyrene resin (Styron G9401, available from A&M Styrene Co., Ltd.; melt index (MI): 2.0) was compounded with 1 part by weight of bentonite (Bentonite Hodaka, available from Hojun Kogyo Co., Ltd.), 0.1 part by weight of talc as a nucleating agent, 3 parts by weight of hexabromocyclododecane as a flame retardant, and 0.3 part by weight of barium stearate as a lubricant, and the compound was heat-kneaded in an extruder at 200° C. Water (0.5 part by weight) and, as other blowing agents, 4 parts by weight of dimethyl ether and 4 parts by weight of isobutane, which are volatile blowing agents, were injected into the mixture while kneaded. After kneading, the mixture was cooled to about 120° C. and extrusion foamed through a slit having a gap of 2 mm into a mold having the inner wall coated with a fluororesin to obtain a styrene resin foamed plate having a thickness of 40 to 50 mm. The results are shown in Table 2. The resulting foams presented a satisfactory appearance and had a foam density of 31 kg/m$^3$, a smaller cell area ratio of 33%, and a thermal conductivity of 0.028 W/mK. Compared with Comparative Example 5 hereinafter described, the product had an increased smaller cell area ratio and an improved thermal conductivity.

EXAMPLE 9

Foams were obtained in the same manner as in Example 8, except for changing the amount of water injected to 1 part by weight. The results obtained are shown in Table 2. The resulting foams presented a satisfactory appearance and had a foam density of 31 kg/m$^3$, a smaller cell area ratio of 51%, and a thermal conductivity of 0.027 W/mK. Compared with Comparative Example 6 hereinafter described, the product had an increased smaller cell area ratio and an improved thermal conductivity.

EXAMPLE 10

Foams were obtained in the same manner as in Example 8, except for changing the amount of water injected to 2 parts by weight. The results obtained are shown in Table 2. The resulting foams presented a satisfactory appearance and had a foam density of 31 kg/m$^3$, a smaller cell area ratio of 54%, and a thermal conductivity of 0.027 W/mK.

EXAMPLE 11

Foams were obtained in the same manner as in Example 8, except that the amount of water injected was changed to 1 part by weight and that 3 parts by weight of methyl chloride and 9 parts by weight of HCFC142b, which are volatile blowing agents, were injected. The results obtained are shown in Table 2. The resulting foams presented a satisfactory appearance and had a foam density of 30 kg/m$^3$, a smaller cell area ratio of 47%, and a thermal conductivity of 0.026 W/mK. Compared with Comparative Example 7 hereinafter described, the product had an increased smaller cell area ratio and an improved thermal conductivity.

EXAMPLE 12

Foams were obtained in the same manner as in Example 8, except that the amount of water injected wan changed to 2 parts by weight and that 3 parts by weight of methyl chloride and 9 parts by weight of HCFC142b, which are volatile blowing agents, were injected. The results obtained are shown in Table 2. The resulting foams presented a satisfactory appearance and had a foam density of 30 kg/m$^3$, a smaller cell area ratio of 52%, and a thermal conductivity of 0.026 W/mK. Compared with Comparative Examples 8 to 10 hereinafter described, the product had an increased smaller cell area ratio and an improved thermal conductivity.

EXAMPLE 13

Foams were obtained in the same manner as in Example 8, except that the amount of water injected was changed to 1.8 parts by weight and that 9 parts by weight of HCFC142b, which is a volatile blowing agent, was injected, The results obtained are shown in Table 2. The resulting foams presented a satisfactory appearance and had a foam density of 42 kg/m$^3$, a smaller cell area ratio of 48%, and a thermal conductivity of 0.026 W/mK.

COMPARATIVE EXAMPLE 5

Foams were obtained in the same manner as in Example 8, except that bentonite was replaced with 1 part by weight of a water-asorbing polymer (Aqualisc CAML10, available from Nippon Shokubai Co., Ltd.), the amount of water injected was changed to 0.5 part by weight, and 4 parts by weight of dimethyl ether and 4 parts by weight of isobutane, which are volatile blowing agents, were injected. The results obtained are shown in Table 2. The resulting foams presented a satisfactory appearance and had a foam density of 31 kg/m$^3$, a smaller cell area ratio of 13%, and a thermal conductivity of 0.029 W/mK.

COMPARATIVE EXAMPLE 6

Foams were obtained in the same manner as in Example 8, except that bentonite was replaced with 1 part by weight of the water-absorbing polyer, the amount of water injected was changed to 1 part by weight, and 4 parts by weight of dimethyl ether and 4 parts by weight of isobutane, which are volatile blowing agents, were injected. The results obtained are shown in Table 2. The resulting foams had a poor appearance which is considered attributed to insufficient dispersion of water. The foam had a foam density of 35 kg/m$^3$, a smaller cell area ratio of 11%, and a thermal conductivity of 0.031 W/mk.

COMPARATIVE EXAMPLE 7

Foams were obtained in the same manner as in Example 8, except that bentonite was replaced with 1 part by weight of the water-absorbing polymer, the amount of water injected was changed to 1 part by weight, and 3 parts by weight of methyl chloride and 9 parts by weight of HCFC142b, which are volatile blowing agents, were injected. The results obtained are shown in Table 2. The resulting foams had a poor appearance which is considered attributed to insufficient dispersion of water. The foam had a foam density of 33 kg/m$^3$, a smaller cell area ratio of 17%, and a thermal conductivity of 0.030 W/mK.

COMPARATIVE EXAMPLE 8

Foams were obtained in the same manner as in Example 8, except that bentonite was replaced with 1 part by weight of the water-absorbing polymer, the amount of water injected was changed to 2 parts by weight, and 3 parts by weight of methyl chloride and 9 parts by weight of HCFC142b, which are volatile blowing agents, were injected. The results obtained are shown in Table 2. The resulting foams had a poor appearance which is considered attributed to insufficient dispersion of water. The foam had a foam density of 34 kg/m$^3$, a smaller cell area ratio of 18%, and a thermal conductivity of 0.030 W/mK.

COMPARATIVE EXAMPLE 9

Foams were obtained in the same manner as in Example 8, except that bentonite was replaced with 1 part by weight of anhydrous silica (AEROSIL, available from Nippon Aerosil Co., Ltd.), the amount of water injected was changed to 2 parts by weight, and 3 parts by weight of methyl chloride and 9 parts by weight of HCFC142b, which are volatile blowing agents, were injected. The results obtained are shown in Table 2. The resulting foams had a poor appearance which is considered attributed to insufficient dispersion of water. The foam had a foam density of 35 kg/m$^3$, a smaller cell area ratio of 15%, and a thermal conductivity of 0.031 W/mK.

COMPARATIVE EXAMPLE 10

Foams were obtained in the same manner as in Example 8, except that bentonite was replaced with 1 part by weight of magnesium silicate (Laponite, available from Nippon Silica Industrial Co., Ltd.), the amount of water injected was changed to 2 parts by weight, and 3 parts by weight of methyl chloride and 9 parts by weight of HCFC142b, which are volatile blowing agents, were injected. The results obtained are shown in Table 2. Foaming was unsatisfactory due to generation of smaller cells, and the resulting foams had a poor appearance with a non-smooth skin. The foam had a foam density of 34 kg/m$^3$, a smaller call area ratio of 18%, and a thermal conductivity of 0.030 W/mK.

TABLE 2

| Formulation and Evaluation | Example | | | | | | Compara. Example | | | | | |
|---|---|---|---|---|---|---|---|---|---|---|---|---|
| | 8 | 9 | 10 | 11 | 12 | 13 | 5 | 6 | 7 | 8 | 9 | 10 |
| Water (pt. by wt.) | 0.5 | 1 | 2 | 1 | 2 | 1.8 | 0.5 | 1 | 1 | 2 | 2 | 2 |
| Dimethyl ether (pt. by wt.) | 4 | 4 | 4 | | | | 4 | 4 | | | | |
| Isobutane (pt. by wt.) | 4 | 4 | 4 | | | | 4 | 4 | | | | |
| Methyl chloride (pt. By wt.) | | | | 3 | 3 | | | | 3 | 3 | 3 | 3 |
| F142b (pt. by wt.) | | | | 9 | 9 | 9 | | | 9 | 9 | 9 | 9 |
| Bentonite (pt. by wt.) | 1 | 1 | 1 | 1 | 1 | 1 | | | | | | |
| Water-absorbing polymer (pt. by wt.) | | | | | | | 1 | 1 | 1 | 1 | | |
| Anhydrous silica (pt. By wt.) | | | | | | | | | | | 1 | |
| Magnesium silicate (pt. By wt.) | | | | | | | | | | | | 1 |
| Foam density (kg/m$^3$) | 31 | 31 | 31 | 30 | 30 | 42 | 31 | 35 | 33 | 34 | 35 | 34 |
| Foam appearance | ○ | ○ | ○ | ○ | ○ | ○ | ○ | x | x | x | x | x |

TABLE 2-continued

| Formulation and | Example | | | | | | Compara. Example | | | | | |
|---|---|---|---|---|---|---|---|---|---|---|---|---|
| Evaluation | 8 | 9 | 10 | 11 | 12 | 13 | 5 | 6 | 7 | 8 | 9 | 10 |
| Small cell area ratio (%) | 33 | 51 | 54 | 47 | 52 | 48 | 13 | 11 | 17 | 18 | 15 | 18 |
| Thermal conductivity (W/mK) | 0.028 | 0.027 | 0.027 | 0.026 | 0.026 | 0.026 | 0.029 | 0.031 | 0.030 | 0.030 | 0.031 | 0.030 |

Industrial Applicability

According to the present invention, a light-weight foams having excellent thermal insulating properties can be obtained even with a reduced blowing agent which may adversely affect the environment by making effective use of environment friendly water as a blowing agent. The invention provides foams made of large cells and small cells in which the small cells are satisfactorily formed to have an improved small cell area ratio. A desirable cell structure made of large cells and small cells can thus be obtained, which will bring about further improvement of thermal insulating performance.

What is claimed is:

1. Polystyrene resin extruded foams comprising 0.2 to 10 parts by weight of bentonite per 100 parts by weight of a polystyrene resin, and water as a blowing agent.

2. The polystyrene resin extruded foams according to claim 1, wherein the water as a blowing agent is used in an amount of 0.2 to 4 parts by weight.

3. The polystyrene resin extruded foams according to claim 1 or 2, which have a density of 15 to 50 kg/m$^3$.

4. The polystyrene resin extruded foams according to claim 1 or 2, wherein cells which constitute the synthetic thermoplastic resin extruded foams have an average cell size of 0.7 mm or smaller.

5. The polystyrene resin extruded foams according to claim 1 or 2, wherein cells which form the synthetic thermoplastic resin extruded foams mainly comprise cells having a cell size of 0.25 mm or smaller and cells having a cell size of 0.3 to 1 mm, these cells being dispersed via cell walls in a sea-island structure, and said cells having a cell size of 0.25 mm or smaller have an area ratio of 10 to 90% in a cross-sectional area of said foams.

6. The polystyrene resin extruded foams according to claim 1 or 2, wherein said foams are boards having a thickness of 10 to 150 mm.

7. The polystyrene resin extruded foams according to claim 1 or 2, wherein liquid paraffin is used in an amount of 0.05 to 3 parts by weight as a viscosity modifier.

8. A method for producing the polystyrene resin extruded foams according to claim 1 or 2 comprising injecting a blowing agent into a molten polystyrene resin and extrusion foaming the resin, wherein the foams contain 0.2 to 10 parts by weight of bentonite per 100 parts by weight of the polystyrene resin and wherein water is used as a blowing agent.

* * * * *

UNITED STATES PATENT AND TRADEMARK OFFICE
CERTIFICATE OF CORRECTION

PATENT NO.    : 6,528,548 B2  
DATED         : March 4, 2003  
INVENTOR(S)   : Hayashi et al.

It is certified that error appears in the above-identified patent and that said Letters Patent is hereby corrected as shown below:

<u>Title page,</u>  
Item [30], Foreign Application Priority Data, delete "Jan. 19, 2000  (DE) ............ 100 01 907"

Signed and Sealed this

Twenty-third Day of September, 2003

JAMES E. ROGAN  
*Director of the United States Patent and Trademark Office*